United States Patent
Henderson et al.

(10) Patent No.: US 9,479,207 B2
(45) Date of Patent: Oct. 25, 2016

(54) NARROWBAND RSSI TECHNIQUE(S) FOR THE MITIGATION OF ADJACENT SATELLITE INTERFERENCE

(71) Applicant: ThinKom Solutions, Inc., Torrance, CA (US)

(72) Inventors: William Henderson, Bedford, NH (US); Talat Kiani, Mission Viejo, CA (US)

(73) Assignee: ThinKom Soultions, Inc., Hawthorne, CA (US)

( * ) Notice: Subject to any disclaimer, the term of this patent is extended or adjusted under 35 U.S.C. 154(b) by 271 days.

(21) Appl. No.: 14/302,854

(22) Filed: Jun. 12, 2014

(65) Prior Publication Data
US 2015/0365116 A1 Dec. 17, 2015

(51) Int. Cl.
| | |
|---|---|
| H04B 1/00 | (2006.01) |
| H04B 15/00 | (2006.01) |
| H04B 1/10 | (2006.01) |
| G01S 3/04 | (2006.01) |
| G01S 3/38 | (2006.01) |
| H04B 7/185 | (2006.01) |

(52) U.S. Cl.
CPC .............. *H04B 1/1036* (2013.01); *G01S 3/04* (2013.01); *G01S 3/38* (2013.01); *H04B 7/1851* (2013.01); *H04B 2001/1063* (2013.01)

(58) Field of Classification Search
CPC .......... H04B 1/036; H04B 2001/1045; H04B 2001/1063; H04B 7/1851; H04B 17/318; H04B 1/1036; G01S 3/38
USPC ............................................... 455/63.1, 63.4
See application file for complete search history.

(56) References Cited

U.S. PATENT DOCUMENTS

| | | | |
|---|---|---|---|
| 3,309,699 A | 3/1967 | Erdle | |
| 2002/0097184 A1 | 7/2002 | Mayersak | |
| 2003/0078040 A1 | 4/2003 | Mayfield et al. | |
| 2005/0176392 A1* | 8/2005 | Ruitenburg | H04B 17/318 455/226.2 |
| 2008/0240301 A1* | 10/2008 | Mandal | G01R 23/163 375/340 |
| 2012/0295604 A1* | 11/2012 | Gunzelmann | H04B 1/1036 455/422.1 |

OTHER PUBLICATIONS

Extended European Search Report dated Oct. 29, 2015 for corresponding European application No. 15170496.2.

* cited by examiner

*Primary Examiner* — Ayodeji Ayotunde
(74) *Attorney, Agent, or Firm* — Renner, Otto, Boisselle & Sklar, LLP.

(57) ABSTRACT

A device and method for tracking a signal of interest from a signal transmitting device, in the presence of cross-polarization or adjacent emitter interference, is provided. An antenna, which may have a beamwidth greater than an angular spacing of geo-stationary transmitting device, is used to receive the signal of interest from a transmitting device. The received signal of interest is analyzed to determine a frequency characteristic of the received signal of interest, and a filter of a plurality of filters is selected based on the determined bandwidth of the signal of interest. The selected filter is applied to the received signal of interest.

34 Claims, 4 Drawing Sheets

NARROWBAND RSSI TECHNIQUE(S) FOR THE MITIGATION OF ADJACENT SATELLITE INTERFERENCE

TECHNICAL FIELD

The present invention relates to receivers for communication systems and, more particularly, to a Received Signal Strength Indicator (RSSI) circuit and method for use in communication systems.

BACKGROUND ART

Conventionally, high quality, expensive Inertial Navigation Systems (INSs) are used to determine the geo-location and attitude of an earth-station antenna's base. Such geo-location and attitude information, coupled with angular position sensors (which describe the angular relationship between an antenna Line-of-Sight (LOS)) and detailed ephemeris information (which describes the location and inclination of the satellite of interest), can be used to compute pointing angles needed to point the earth-station antenna at the satellite of interest. Such an approach is considered an open-loop pointing approach.

Another option for determining the pointing angles for the antenna is to use a Received Signal Strength Indicator (RSSI) to report the strength of received radio frequency energy, which can be used to help find a satellite of interest. RSSIs measure a power level that a Radio Frequency (RF) device is receiving from a radio infrastructure at a given location and time. RSSIs often employ a broad-spectrum envelope power detector to sense the RF energy from a whole satellite transponder or from all the transponders on a particular satellite. Based on the received signal strength, the pointing angles for the antenna can be calculated.

Yet another option for determining the pointing angles is to use an envelope power detector to first find a certain, particularly strong satellite signal on a Direct Broadcast Satellite (DBS) service. Pointing then can be offset from the found signal to find the actual satellite of interest.

Another class of systems use beacon receivers to help solve the problem of properly pointing the earth-station antenna. This often introduces considerable cost and complexity to the system since beacon receivers operate on very low power satellite signals which, in turn, require that the beacon receiver have an exceptionally narrow bandwidth (on the order of a few hundred Hz for a small aperture antenna). This makes such systems extremely vulnerable to clock drift and Doppler frequency shift, and usually requires the use of Phase Lock Loop Low Noise Blocks (LNBs) along with a precision, temperature compensated ten MHz reference. The beacon to be tracked is usually found on one of the two possible polarizations, and is often located on the satellite transponder band edge. Further, not all satellites of interest are equipped or even provisioned to provide a suitable beacon signal. As a result, there is a strong likelihood that the system may not be able to use the satellite beacon (if present) due to a polarization mismatch, or, in the case of small instantaneous bandwidth or phased-array antennas, because the earth-station antenna is not able to see the beacon and the satellite transponder of interest at the same time.

SUMMARY OF INVENTION

To avoid the problems caused by adjacent satellite interference, some systems require the use of costly, large and heavy, narrow beamwidth antennas, which have beamwidths less than the angular spacing of the geo-stationary satellites. Use of such narrow-beam antennas can introduce significant challenges in the acquisition and tracking of satellites, especially for on-the-move systems.

A proposed narrow-band RSSI (NbRSSI) device and method in accordance with the present disclosure overcomes one or more of the short-comings of conventional implementations. More particularly, an NbRSSI in accordance with the present disclosure can track on the actual communication signal itself, which typically is wide enough to not require sophisticated clock and frequency control and by its nature is always the correct polarization and in-band.

The device and method in accordance with the present disclosure can solve the problem of optimally pointing an earth-station antenna and specifically the locating of, pointing to, and tracking of a Radio Frequency or Intermediate Frequency (IF) signal from an earth-orbiting satellite. The device and method in accordance with the present disclosure are useful with wide beamwidth antennas, which have beamwidths greater than the angular spacing of geo-stationary satellites. In this regard, interference that comes from the presence of adjacent satellites transmitting in the same RF band can be suppressed.

Further, the components required to realize the design in accordance with the present disclosure are small, low-cost, and low-power. This allows narrow-band RSSI features to be incorporated into a wide variety of embedded systems where size, weight, power and cost are critical design parameters.

According to one aspect of the invention, a method for tracking a signal of interest from a signal transmitting device is provided, the method being performed using an antenna to scan for the signal of interest. The method includes selecting a filter from a filter bank including a plurality of filters having at least two filters with different bandwidths, wherein the selected filter is a filter having a largest bandwidth of the plurality of filters that is equal to or less than a bandwidth of the signal of interest.

According to one aspect of the invention, the method includes determining the presence of other transmitting devices within a beamwidth of the antenna, and when other transmitting devices are not within the beamwidth of the antenna selecting includes selecting a filter having a largest bandwidth of the plurality of filters that is equal to or less than a carrier signal of the signal of interest.

According to one aspect of the invention, the method includes determining the presence of other transmitting devices within a beamwidth of the antenna, and when other transmitting devices are within the beamwidth of the antenna, determining if the additional transmitting devices have signals present within a band of interest.

According to one aspect of the invention, when the additional transmitting devices have signals present within a band of interest, the method includes requesting a satellite service operator to create a null-band on the signal of interest.

According to one aspect of the invention, selecting a filter includes selecting a filter of the plurality of filters having a largest bandwidth that is equal to or less than a null-band of the signal of interest.

According to one aspect of the invention, the method includes using a narrow-band null search methodology to track the null-band on the signal of interest.

According to one aspect of the invention, when the additional transmitting devices do not have signals present within a band of interest, the method includes determining if the transmitting device has a signal at a center transponder band.

According to one aspect of the invention, when the transmitting device has a signal at a center transponder band, selecting a filter includes selecting a filter of the plurality of filters having a largest bandwidth that is equal to or less than a transponder stop-band of the signal of interest.

According to one aspect of the invention, the method includes using a narrow band null search to track the signal at the center transponder band.

According to one aspect of the invention, when the transmitting device does not have a signal at a center transponder band, the method includes requesting a satellite service operator create a pseudo-beacon signal at a band unused by other transmitting devices within the antenna beam width.

According to one aspect of the invention, selecting a filter includes selecting a filter of the plurality of filters having a largest bandwidth that is equal to or less than the pseudo-beacon signal.

According to one aspect of the invention, the method includes using a narrow band pseudo-beacon receiver methodology to track the pseudo-beacon signal on the signal of interest.

According to one aspect of the invention, the method includes using an antenna having a beamwidth greater than an angular spacing of geo-stationary transmitting devices.

According to one aspect of the invention, a narrow-band received signal strength indicator (NbRSSI) circuit for tracking a signal of interest via a wideband antenna includes: a receiver circuit for receiving a signal and down converting the received signal to baseband; a logarithmic power detection amplifier; a plurality of filters selectively couplable between an output of the receiver circuit and an input of the logarithmic power detection amplifier, each filter of the plurality of filters having a bandwidth different from other filters of the plurality of filters; and a controller operative to select a filter of the plurality of filters having a largest bandwidth equal to or less than a bandwidth of the signal of interest.

According to one aspect of the invention, the controller is configured to determine the presence of other transmitting devices within a beamwidth of the antenna, and when other transmitting devices are not within the beam width of the antenna, select a filter having a largest bandwidth of the plurality of filters that is equal to or less than a carrier signal of the signal of interest.

According to one aspect of the invention, the controller is configured to determine the presence of other transmitting devices within a beamwidth of the antenna, and when other transmitting devices are within the beam width of the antenna, determine if the additional transmitting devices have signals present within a band of interest.

According to one aspect of the invention, the controller is configured to request a satellite service operator to creates a null-band on the signal of interest when the additional transmitting devices have signals present within a band of interest.

According to one aspect of the invention, the controller is configured to select a filter of the plurality of filters having a largest bandwidth that is equal to or less than the null-band of the signal of interest.

According to one aspect of the invention, the controller is configured to use a narrow-band null search methodology to track the null-band on the signal of interest.

According to one aspect of the invention, the controller is configured to determine if the transmitting device has a signal at a center transponder band when the additional transmitting devices do not have signals present within a band of interest.

According to one aspect of the invention, the controller is configured to select a filter of the plurality of filters having a largest bandwidth that is equal to or less than a transponder stop-band of the signal of interest when the transmitting device has a signal at a center transponder band.

According to one aspect of the invention, the controller is configured to use a narrow-band null search to track the signal at the center transponder band.

According to one aspect of the invention, the controller is configured to request a satellite service operator create a pseudo-beacon signal at a band unused by other transmitting devices within the antenna beam width when the transmitting device does not have a signal at a center transponder band.

According to one aspect of the invention, the controller is configured to select a filter of the plurality of filters having a largest bandwidth that is equal to or less than the pseudo-beacon signal.

According to one aspect of the invention, the controller is configured to use a narrow-band pseudo-beacon receiver methodology to track the pseudo-beacon signal on the signal of interest.

According to one aspect of the invention, the receiver circuit comprises: a mixer for mixing a plurality of signals; a local oscillator circuit having an output electrically connected to a first input of the mixer; and a clock circuit electrically connected to the local oscillator output.

According to one aspect of the invention, the clock circuit comprises: an oscillator; a global positioning system (GPS) receiver; and a counter including a count input for counting a number of pulses and a reset input for resetting the counted number of pulses, wherein an output of the local oscillator is operatively coupled to the count input, and the output of the GPS receiver is operatively coupled to the reset input.

According to one aspect of the invention, the circuit includes a multiplexor operatively coupled to the plurality of filters and the controller, the multiplexor operative to selectively couple one of the plurality of filters between the output of the receiver circuit and the input of the logarithmic power amplifier.

According to one aspect of the invention, an antenna acquisition and tracking positioning system for communicating with a satellite of a plurality of satellites includes: an antenna including an output for outputting a received a signal; the NbRSSI circuit as described herein operatively coupled to the antenna output; and positioning circuitry operatively coupled to an output of the NbRSSI circuit, the circuitry operative to command a position of the antenna based on data received from the NbRSSI circuit.

According to one aspect of the invention, the positioning circuitry comprises a processor and memory, and positioning logic stored in the memory and executable by the processor, wherein when executed by the processor the positioning logic causes the processor to control a position of the antenna based on the output of the NbRSSI circuit.

According to one aspect of the invention, the positioning circuitry is operative to: cause the antenna beam to sweep in heading; monitor the received signal strength provided by the NbRSSI circuit; identify a signal of interest based on an output of the NbRSSI circuit; and command the antenna to a position corresponding to the signal of interest.

According to one aspect of the invention, a beamwidth of the antenna is greater than an angular spacing of the plurality of satellites.

According to one aspect of the invention, the system includes an actuator operatively coupled to the antenna and to the positioning circuitry, the actuator operative to effect a change in position of the antenna based on the command provided by the positioning circuitry.

According to one aspect of the invention, the actuator comprises a motor and a motor controller.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1:
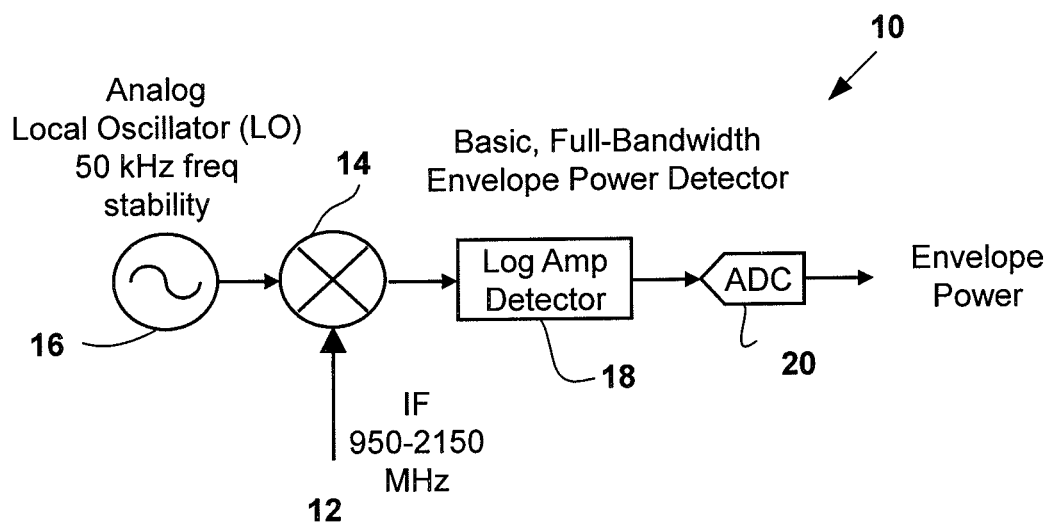
FIG. 1 is a block diagram of a conventional envelope power detector circuit.

Conventional wide-band RSSI approaches, such as an Envelope Power Detector illustrated 10 in the FIG. 1, are limited to use in situations where a satellite of interest has a fully loaded transponder, i.e., a large portion of the available transponder bandwidth is utilized or "loaded" with signal energy. In such a device, an Intermediate Frequency (IF) signal 12 is provided to a mixer 14 and mixed down to baseband using an analog, fixed frequency Local Oscillator (LO) 16 that is roughly centered on a mid-band frequency of the transponder of interest. A Logarithmic Amplifier (Log Amp) Detector 18 is used to create an output signal that is proportional to the power received from the whole satellite.

In a digital system, the power can be sampled by an Analog to Digital Converter (ADC) 20, whereas a purely analog system could directly use the output of the Log Amp Detector 18. Some systems use a simple square-law diode (not shown) instead of a Log Amp Detector 18.

In general, such analog systems suffer from excessive frequency drift, low-selectivity, and, in the case of the square-law diode, poor power linearity. Furthermore, the fixed frequency of the Linear Oscillator 16 limits the use of the circuit to situations where the satellite transmit frequency is fixed and is known a priori.

Figure 2:
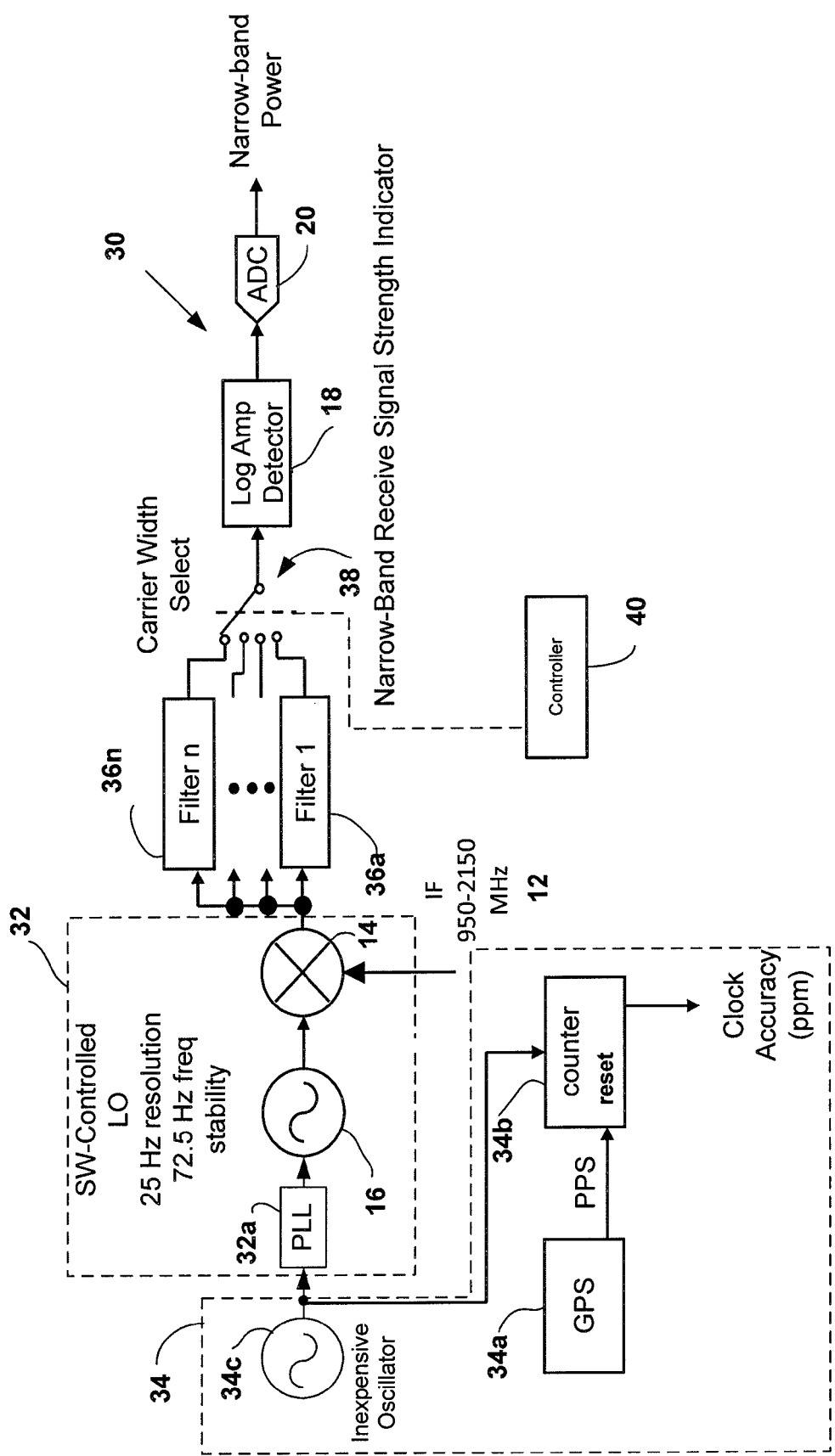
FIG. 2 is a block diagram of a narrow-band RSSI circuit in accordance with an exemplary embodiment of the invention.

Referring to FIG. 2, an exemplary RSSI circuit 30 in accordance with the present disclosure is illustrated. The circuit 30 enables an antenna acquisition and tracking system to find and track a particular carrier frequency. The circuit 30 uses a simple, low cost receiver 32 to convert the incoming Intermediate Frequency signal 12 down to baseband, which is typically 4 MHz and below, via mixer 14. The receiver 32 can be set to look at a particular frequency band via a software-controlled Local Oscillator 16 that is tied to a high frequency stability clock source 34, which may be formed by a Global Positioning System (GPS) receiver 34a, an inexpensive oscillator 34c and a counter 34b. The software-controlled LO consists of this high frequency stability clock source (34) and a Phase-Lock Loop (PLL) 32a within the receiver which multiplies the base oscillator frequency (typically 25 MHz) up to IF band (950-2150 MHz).

More specifically, the frequency drift of the inexpensive oscillator portion of the Inexpensive Oscillator 34c can be compensated for by comparing its output with the Pulse per Second (PPS) output of the GPS receiver 34a. The GPS PPS is a highly accurate time synchronization signal found on most commercial GPS receivers, and it provides a one milli-second wide pulse once per second. The rising edge of this pulse is tied to the atomic clock system used as part of the overall GPS system and it is accurate to 60 ns or better. In this regard, the PPS output of the GPS receiver 34a is connected to a reset input of the counter 34b, and a count input of the counter 34b is connected to an output of the inexpensive oscillator 34c. By counting the number of clocks cycles produced by the inexpensive oscillator 34c over each second, the exact frequency of the inexpensive oscillator 34c can be continuously measured as this oscillator slowly drifts over time and temperature. This information can then be used to continually adjust the PLL 32a within the receiver so as to keep the LO at the particular desired frequency. By reducing this source of frequency drift, a tighter filter can be used, thus improving Signal to Noise Ratio (SNR) of the circuit.

While the circuit 30 is illustrated using discrete components, it will be understood that the circuit could be implemented via specific hardware, such as within an application specific integrated circuit (ASIC). Further, reference to the term "circuitry" will be understood to refer to both hardware circuits (e.g., circuits formed from discrete components and/or ASICs) as well as micro-processor based circuits that execute logic in the form of code stored in memory.

If the earth-station antenna is moving relative to the satellite from which it is receiving a signal, this will result in a Doppler frequency shift on the down-converted IF signal on which the RSSI circuit is operating. This normally requires that the selected filter have extra bandwidth to accommodate the range of relative speeds that the earth-station antenna will experience. The extra bandwidth on this filter, beyond the bandwidth of the desired signal, results in a degradation of the Signal to Noise Ratio (SNR). As an alternative to wider filters, geo-location navigation data of Earth Station and/or satellite ephemeris data could be used to calculate the Doppler frequency shift of the incoming signal 12 within a processor. The frequency shift to be expected is a function of the carrier frequency itself and the relative speed along the line-of-sight axis between the satellite and the earth-station. This calculated frequency shift could then be used to proactively adjust the receiver down-converter frequency so that the baseband signal is kept relatively constant in frequency. This will allow a tighter filter to be used, thus improving Signal to Noise Ratio. Additionally, the receiver 32 can be configured to adjust the front-end, pre-mixer gain as well as adjust the outgoing baseband gain using a priori knowledge of the desired signal strength to maximize gain while avoiding saturation. The gain stages are typically built into the receiver and are controlled by software commands.

The output of the receiver 32 is then fed to an assortment of analog filters 36a-36n, the output of which can be selected by a multiplexer 38 which then feeds a logarithmic power detection amplifier 18. Multiplexor 38 may be under the control of controller 40, which may be a dedicated discrete hardware circuit or ASIC, or a microprocessor-based circuit. The analog output of the amplifier 18 is then sampled via ADC 20 and software can then interpret the resultant value as a Receive Signal Strength Indicator (RSSI). Multiplexor 38 may be under the control of a controller, such as a microprocessor-based controller.

As an alternative, a suitably fast Analog-to-Digital Converter (ADC) can be used at any point along the path of the circuit and all subsequent steps can be performed in software. For example, if an appropriate ADC is used at the output of the receiver 32, then the filter function (36a-36n) can be performed in software along with all the subsequent functions.

Preferably, filters 36a-36n are selected to have a bandwidth that is as wide as the carrier frequency to be tracked, but not wider. The filter bandwidth should also be wide enough to allow for frequency shifting that may result from local clock drift and from Doppler effects that are caused by a change in the range rate between the earth-station antenna and the satellite.

Selectable filters 36a-36n of various bandwidths allow maximization of Signal to Noise Ratio. Signals out of band are rejected, which improves pointing accuracy. Sources of frequency drift such as Doppler shift and clock drift are compensated for using the clock source 34 or alternative methodology, which enables the use of tighter filters and in turn allows for higher Signal to Noise Ratio.

Further, software approaches can take advantage of the selectable width filters 36a-36n in conjunction with the particular characteristics of the frequency and stop-band arrangements of the geo-stationary satellite constellation to implement special techniques. For example, one or more of the described Narrow-band Null Search mode (NbNS), Narrow-band Stop-Band Search (NbSBS) mode and Narrow-band Pseudo-Beacon Receiver (NbPBR) mode can be implemented in the circuit to avoid interference often caused by adjacent satellites, particularly when small aperture earth-station antennas are being used.

The employed filter architecture in accordance with the present disclosure allows for more selective pointing of the earth-station antenna, which minimizes the problem of locking on the wrong satellite or being drawn-off the desired satellite (mispointing error) by undesired emissions from adjacent satellites. The filter architecture allows for more accurate pointing of the earth-station antenna, which reduces the problem of adjacent satellite interference. Adjacent satellite interference can be particularly acute for low-profile and small aperture antennas (<30 wavelengths in size in either height or width) which tend to have beamwidths on the same order or larger than the angular spacing of earth-orbiting, geo-stationary satellites (typically between 2 degrees to 3 degrees). The filter architecture also allows for faster acquisition of the satellite of interest, which reduces set-up time.

The device and method in accordance with the present disclosure can be used across a variety of product lines including flat-plate antennas, phased array antennas, dish antennas, and any antenna whose beam can be steered. The device and method in accordance with the present disclosure can be used across a variety of RF bands including, but not limited to, L-Band, S-Band, C-Band, X-Band, Ku-Band, Ka-Band, Q-Band, E-Band, V-Band and W-band. The device and method are especially useful for wide beamwidth antennas, as it helps them avoid interference that comes from the presence of adjacent satellites transmitting in the same RF band. As used herein, a wide beamwidth antenna is defined as an antenna having a beamwidth greater than the angular spacing of geo-stationary satellites (typically 30 wavelengths or smaller in height, width or diameter).

In addition to geo-stationary orbit (GSO) satellites, the described invention can provide interference suppression benefits when employed in non-geo-stationary (NGSO) satellite systems as well where interference with adjacent NGSO and adjacent GSO satellites is of increased concern due to the relative movement of NGSO satellites as observed from earth.

Figure 3:
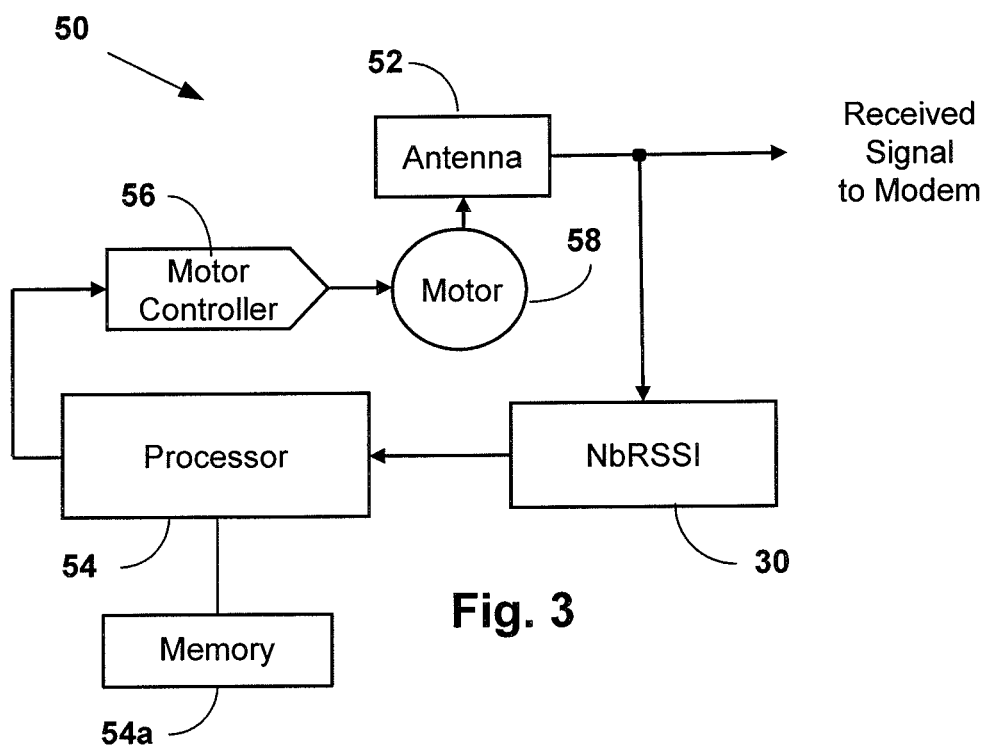
FIG. 3 is a block diagram of an antenna pointing and tracking system incorporating a narrow-band RSSI circuit in accordance with an exemplary embodiment of the invention.

Referring now to FIG. 3, illustrated is a block diagram of an antenna pointing and tracking system 50 that incorporates a narrow-band RSSI circuit 30 in accordance with the present disclosure. An input of the RSSI circuit 30 in accordance with the present disclosure is coupled to a signal output of antenna 52. An output of the RSSI circuit 30 is operatively coupled to a processor 54 and memory 54a, which may be a PLC or other smart controller. Stored in the memory 54a and executable by the processor 54 may be logic for carrying various operations, including selection of the one or more filters 36a-36n, positioning the antenna 52 and tracking a signal of interest.

The processor and memory receives data corresponding to a signal provided at the antenna output. The processor 54 can analyze the data provided by the RSSI circuit 30 and select the appropriate filter 36a-36n and the appropriate tracking methodology. Further details regarding such logic are described in more detail below and in particular with respect to FIG. 6.

The processor 54 can include positioning circuitry that, based on the data from the RSSI circuit 30, determines whether or not the antenna 52 should be re-positioned in order to obtain an improved signal. Positioning of the antenna 52 can be based on the signal strength, as described below with respect to FIG. 4. Should the antenna 52 require repositioning, the processor 54 can provide a position command to an actuator, which may be embodied as a motor controller 56 and motor (or motors) 58, so as to alter a position of the antenna 52 to correspond to the commanded position.

Figure 4:
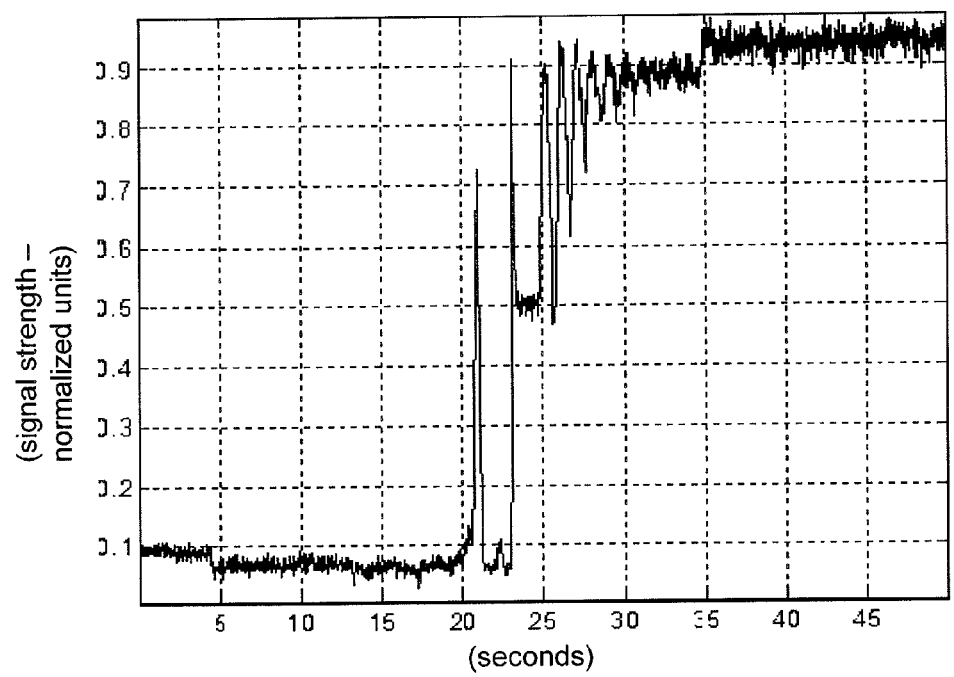
FIG. 4 is a narrow-band RSSI signal profile (in time) according to an exemplary embodiment of the invention in typical use.

Referring to FIG. 4, an exemplary (time) profile of a narrow-band RSSI signal is illustrated during find, acquire, peak-up and track of a satellite signal of interest. In the figure, the x-axis represents time (seconds) and the y-axis represents signal strength in normalized units. From time 0 to approximately 22 seconds, the antenna beam is swept in azimuth while the processor 54 monitors the narrow-band RSSI signal provided by the NbRSSI circuit 30. The sharp peak observed at approximately 21 seconds is caused by the antenna 52 sweeping past the signal of interest.

At the end of the heading sweep (t=22 seconds), the processor 54, knowing the approximate location of the signal of interest, commands the motor controller 56 to position the antenna 52 back to the heading angle where the peak signal was observed. At t=23 seconds, the position of the antenna 52 has settled at the peak angle, at which point a conical scan is initiated to dither the beam around the initial pointing angle. The strength of the narrow band RSSI signal is used to peak up the pointing (from t=25 seconds to t=35 seconds), and then the dither is discontinued to allow the antenna 52 to be optimally pointed (from t=35 seconds on). Depending on the nature of the system, the conical scan/peaking cycle can be repeatedly called on either a periodic or continuous basis to keep the antenna system properly pointed. Positioning circuitry, such as code stored in memory 54a and executed by the processor 54, can cause the system 50 to perform the above operations.

The device and method in accordance with the present disclosure allow an antenna pointing and tracking system to operate with a satellite that has only partially populated transponders, meaning satellite transponders which are lightly-loaded, with much of the allocated frequency bandwidth of the transponder unused (not modulated.) Additionally, since systems which rely on a wide-band RSSI signal respond to a broad range of frequencies, these systems tend to have an increased susceptibility to interference from adjacent satellites as compared to the approach in accordance with the present disclosure, which utilizes a much more selective narrow-band RSSI signal. The RSSI approach is useful for antenna pointing calibration for both mechanically steered and Electronically Scanned Arrays (ESAs).

The device and method in accordance with the present disclosure will aid in satellite acquisition, antenna pointing and satellite tracking while stationary or on-the-move (ground mobile, marine, as well as airborne) for antennas across a multiplicity of RF bands. The device and method in accordance with the present disclosure are particularly useful for wide beamwidth antennas, which have beamwidths greater than the angular spacing of geo-stationary satellites. In this regard, the device and method in accordance with the present disclosure can avoid interference that comes from the presence of adjacent satellites transmitting in the same RF frequency band.

While intended for acquisition and tracking of geo-stationary satellites, if satellite ephemeris data is provided the device and method in accordance with the present disclosure will work equally well with Mid-Earth Orbit (MEO) and Low-Earth Orbit (LEO) satellites (i.e. "Non Geo Stationary Orbit (NGSO), which are constantly moving with respect to the earth's surface. Similarly, if appropriate navigation information is provided, the approach can also work with planes, helicopters, Unmanned Aerial Vehicles (UAVs), missiles, airships and other airborne platforms.

Figure 5:
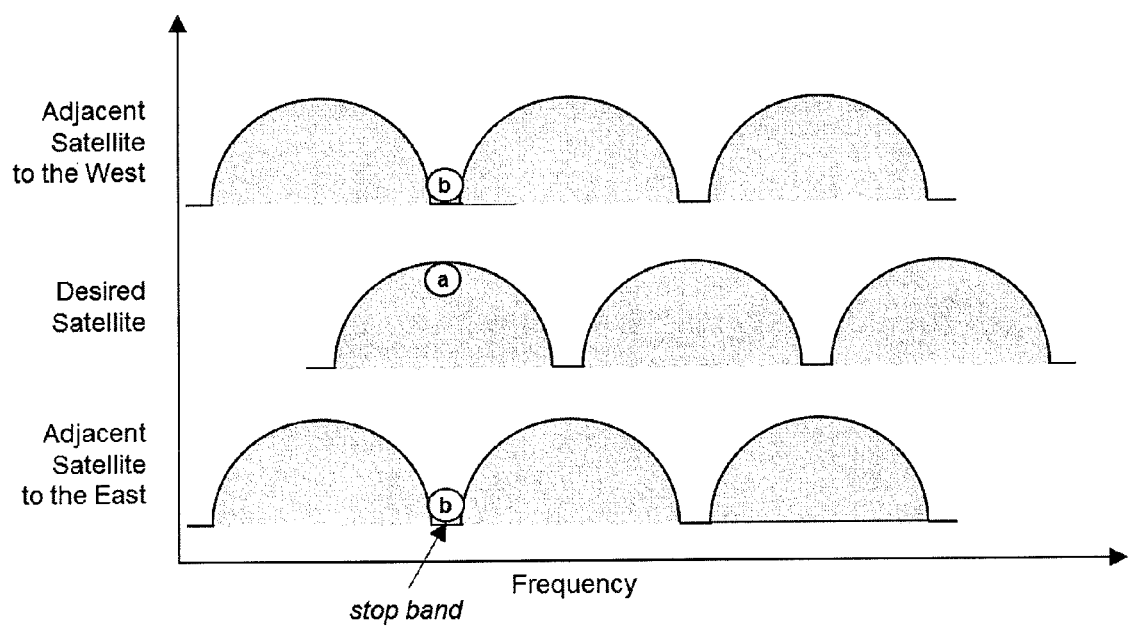
FIG. 5 illustrates an application of a narrow-band RSSI circuit for adjacent satellite interference suppression in accordance with an exemplary embodiment of the invention.

The device and method in accordance with the present disclosure can be used to implement a Narrow-band Stop-Band Search (NbSBS), which allows wide beamwidth antennas (which have beamwidths greater than the angular spacing of geo-stationary satellites) to avoid interference that comes from the presence of adjacent satellites transmitting in the same RF band. This particular scenario takes advantage of the staggering of frequency bands that is typical of satellite transponder frequency assignments. The transmissions at one satellite are offset in frequency from those on the neighboring satellites by exactly one half the width of a transponder band. In addition, there is a stop-band (3 to 5 MHz typical) found at the edge of each transponder band in which no signal energy is transmitted. For any particular satellite, the two neighbor satellites on either side of it will always use a stop-band assignment scheme which is the complement of that particular satellite. This means that for a particular satellite, at the center transponder frequency (see FIG. 5, point "a"), the adjacent satellites will have a stop-band at that frequency (see FIG. 5, points "b"). This allows a large beam width antenna 52 to select a filter 36a-36n almost as wide as the stop-bandwidth and track the satellite of interest without being subjected to interference from the two adjacent neighbors.

The device and method in accordance with the present disclosure can also be used to implement a Narrow-band Null Search (NbNS). NbNSs is advantageous in that it allows wide beam width antennas (which have beam widths greater than the angular spacing of geo-stationary satellites) to avoid interference that comes from the presence of adjacent satellites transmitting in the same RF band. During NbNS mode, the antenna system 50 tracks on a narrow frequency band on the satellite of interest where no energy is being transmitted as long as both adjacent satellites contain energy in this band. The system 50 can first use a wide band filter 36a-36n to make sure it sees the adjacent satellite energy and peak up the antenna pointing using a con-scan approach. Once peaked, the system 50 can quickly switch to using a narrower filter 36a-36n, selected so that it is narrower than the null band of the satellite of interest. The system 50 then can conical scan the antenna 52 and, using inverse logic based on signal minimization, steer the antenna 52 so that it peaks up this null band and thus avoid being pulled-off by the adjacent satellites. At regular intervals, the system 50 can switch to the wider filter 36a-36n to make sure the system is not steering away from the entire satellite cluster.

The device and method in accordance with the present disclosure can also be used to implement a Narrow-band Pseudo-Beacon Receiver (NbPBR) mode, which allows wide beamwidth antennas (which have beamwidths greater than the angular spacing of geo-stationary satellites) avoid interference that comes from the presence of adjacent satellites transmitting in the same RF band. In this implementation the satellite system operator hosts a narrow bandwidth signal on the satellite of interest at a band that is not being used by the two adjacent neighbors (i.e. a pseudo-beacon signal). The earth-station antenna system 50 then selects a filter 36a-36n with a bandwidth matching the narrow bandwidth signal and uses this signal to find and track the satellite of interest without interference from the adjacent satellites.

Figure 6:
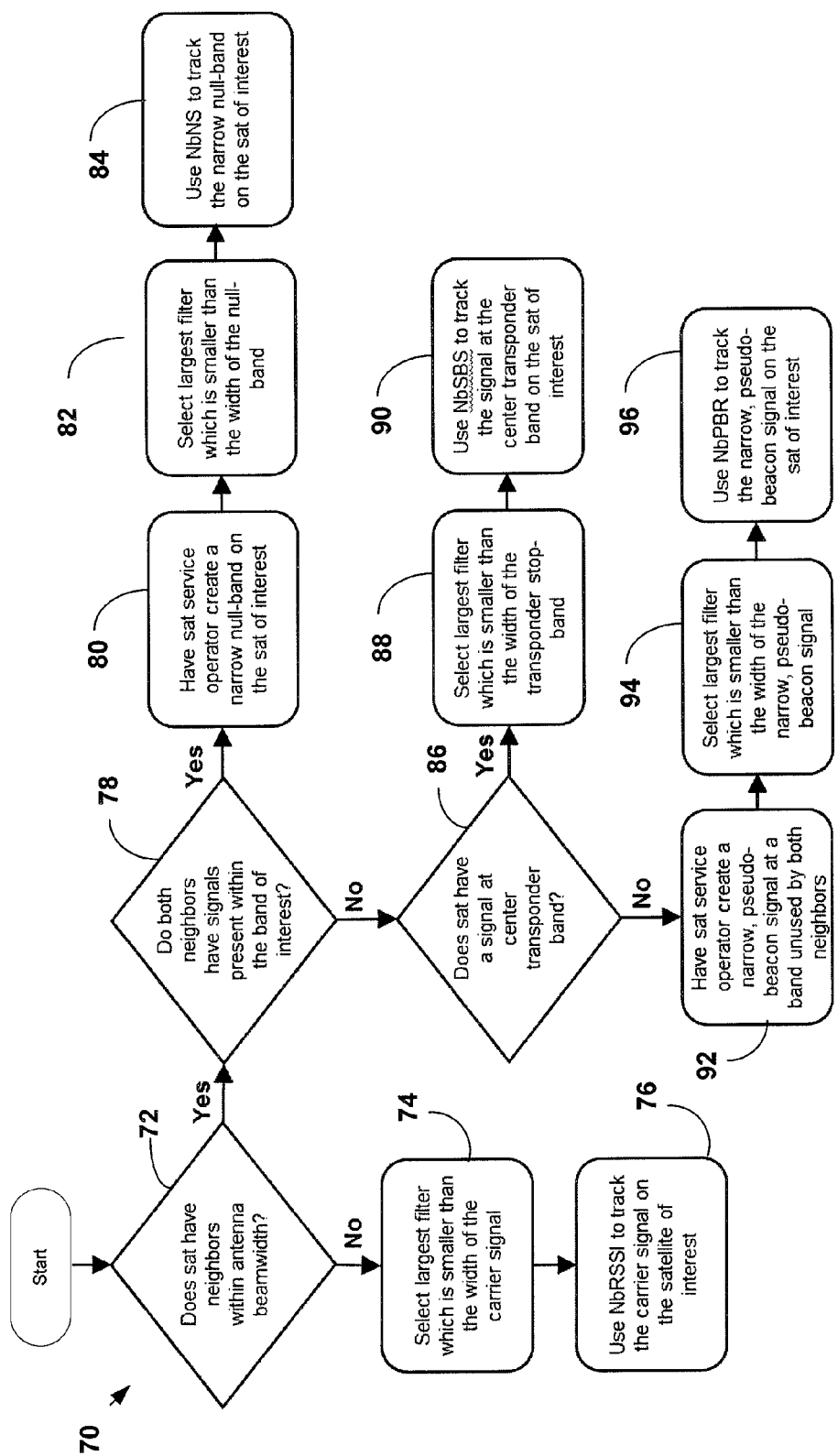
FIG. 6 is a flowchart illustrating exemplary techniques for tracking a satellite of interest employing a narrow-band RSSI circuit in accordance with an exemplary embodiment of the invention.

Referring now to FIG. 6, a flow diagram 70 illustrating an exemplary hierarchical method for utilizing Narrow-band Receive Signal Strength Indicator, Narrow-band Stop-Band Search, Narrow-band Null Search, and Narrow-band Pseudo-Beacon Receiver using the NbRSSI circuitry and processing in accordance with the present disclosure. The methodology illustrated in FIG. 6 may be implemented, for example via the circuit 50 of FIG. 3.

The flow diagram includes a number of process blocks arranged in a particular order. As should be appreciated, many alternatives and equivalents to the illustrated steps may exist and such alternatives and equivalents are intended to fall with the scope of the claims appended hereto. Alternatives may involve carrying out additional steps or actions not specifically recited and/or shown, carrying out steps or actions in a different order from that recited and/or shown, and/or omitting recited and/or shown steps. Alternatives also include carrying out steps or actions concurrently or with partial concurrence.

Beginning at block 72, it is determined if the satellite of interest has any neighbor satellites within the antenna beamwidth of the signal of interest. For example, the presence of neighboring satellites may be determined by performing a scan over a region several times the antenna beamwidth using a wide-bandwidth filter. Data collected during the scan can be analyzed to determine if only a single satellite is present or if a plurality of satellites are present. By observing the −3 dB beamwidth of the observed signal map in both azimuth and elevation and comparing it to the known −3 dB beamwidth of one's own antenna, the presence of neighboring satellites can be determined. The presence of interfering satellites will make the observed −3 dB beamwidth much larger than −3 dB beamwidth of the antenna by itself.

If it is determined that there are no neighboring satellites within the antenna's beamwidth, then the method moves to block 74 where a filter 36a-36n is selected. In selecting the filter 36a-36n, the filter having the largest bandwidth that is smaller than the width of the satellite's carrier signal, which may be known ahead of time based on the satellite of interest, is selected. If the carrier's width is not known, a priori, then progressively larger filters can be tried until SNR starts to decrease. SNR can be determined by comparing the signal level while looking at the satellite to the signal level when looking at cold sky (typically done by increasing elevation angle by an angle that is 3× the elevation beamwidth of the antenna). Filter selection by such a manner, which can be made via multiplexor 38, can optimize Signal to Noise Ratio. Next, at block 76, data from the RSSI circuit 30 is used to track the carrier signal on the satellite of interest.

Moving back to block 72, if the satellite does have neighbors within the antenna beamwidth, then the method moves to block 78 where it is determined if the two neighbors both have signals present within the band of interest. Such determination may be made, for example, by performing a scan over the band of interest while using a filter wide enough to cover the band of interest and analyzing data received during the scan. By observing the −3 dB beamwidth of the observed signal map in both azimuth and elevation and comparing it to the known −3 dB beamwidth of our own antenna, the presence of neighbors with signals within the band of interest can be determined.

If both neighbors have signals in the band of interest, then the method moves to block 80 where a request is made to the satellite service operator to create a narrow null-band on the satellite of interest. For example, a request may be transmitted to the satellite service provider to include a null band of a certain width at a particular frequency by negotiating with the hub at the network provider's home frequency where remote users first log in and request a service assignment. A null band is a band of frequencies where there is no transmission from the satellite. Then at block 82 the filter 36a-36n having the largest bandwidth that is smaller than the width of the requested null-band is selected. For example, the requested width of the null band can be compared to the known bandwidths of the filters 36a-36n, and the filter with the largest bandwidth that is smaller than the width of the requested null-band is selected via multiplexor 38. Next, at block 84, data provided by the RSSI circuit 30 is used in Narrow-band Null Search (NbNS) mode to track the narrow null-band on the satellite of interest.

Moving back to block 78, if only one of the neighboring satellites has signal power present within the band of interest, then the method moves to block 86 where it is determined if the satellite of interest has signal power at the center of the transponder band. The presence of this signal may be determined by performing a scan over a region several times the antenna beamwidth using a filter just smaller than the transponder stop band and centered at the mid-point frequency of the transponder. By observing the −3 dB beamwidth of the observed signal map in both azimuth and elevation and comparing it to the known −3 dB beamwidth of the antenna, the data collected during the scan can be analyzed to determine if the satellite of interest has a signal at the center of the transponder band—a region where the neighbors have stop bands.

If the satellite has a signal at the center of the transponder band, then the method moves to block 88 where the filter 36a-36n having the largest bandwidth that is smaller than the width of the transponder stop band is selected. In making such selection, the width of the transponder stop band may be known or otherwise determined. The known bandwidths of the filters 36a-36n then can be compared to the transponder stop bandwidth, and the filter 36a-36n having the largest bandwidth that is smaller than the width of the transponder stop band is selected, for example, via multiplexor 38. Next at block 90 the RSSI circuit 30 is used in Narrow-band Stop-Band Search (NbSBS) mode to track the signal at the center transponder band on the satellite of interest.

Moving back to block 86, if the satellite does not have a signal at the center of the transponder band, then the method moves to block 92 where the satellite service provided is requested to create a narrow, pseudo-beacon signal at a band unused by both neighbors. A suitable band to use can be found by selecting the filter with the second narrowest bandwidth and then sweeping the frequency of the RSSI circuit across the range of frequencies on the satellite transponder while observing the received power. If a frequency band is found which has no power (i.e. the power level is comparable to that of cold sky), then that band is open and can be used for hosting and tracking a pseudo-beacon signal. Such requests may be made, for example, by specifying a narrow, pseudo-beacon signal of a particular width and transmitting a request to the satellite service provider. This request is typically made/negotiated with the hub at the network provider's home frequency where remote users first log in and request a service assignment. Then at block 94 the filter 36a-36n having the smallest bandwidth is selected via multiplexor 38. Next, at block 96, the RSSI circuit 30 is used in Narrow-band Pseudo-Beacon Receiver (NbPBR) mode to track the narrow, pseudo-beacon signal on the satellite of interest.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

What is claimed is:

1. A method for tracking a signal of interest from a signal transmitting device, the method being performed using a filter bank having a plurality of independent filters, at least two of the plurality of independent filters having different bandwidths, and an antenna to scan for the signal of interest, the method comprising:
   determining which filter of the plurality of independent filters has a largest bandwidth that is equal to or less than a carrier frequency of the signal of interest; and
   selecting the filter having the largest bandwidth equal to or less than the carrier frequency to filter the signal of interest.

2. The method according to claim 1, further comprising determining the presence of other transmitting devices within a beamwidth of the antenna, and when other transmitting devices are not within the beamwidth of the antenna selecting includes selecting a filter having a largest bandwidth of the plurality of filters that is equal to or less than a carrier signal of the signal of interest.

3. The method according to claim 1, further comprising determining the presence of other transmitting devices within a beamwidth of the antenna, and when other transmitting devices are within the beamwidth of the antenna, determining if the additional transmitting devices have signals present within a band of interest.

4. A method for tracking a signal of interest from a signal transmitting device, the method being performed using an antenna to scan for the signal of interest, the method comprising:
   selecting a filter from a filter bank including a plurality of filters having at least two filters with different bandwidths, wherein the selected filter is a filter having a largest bandwidth of the plurality of filters that is equal to or less than a bandwidth of the signal of interest;
   determining the presence of other transmitting devices within a beamwidth of the antenna, and when other transmitting devices are within the beamwidth of the antenna, determining if the additional transmitting devices have signals present within a band of interest, wherein when the additional transmitting devices have signals present within a band of interest, requesting a satellite service operator to create a null-band on the signal of interest.

5. The method according to claim 4, wherein selecting a filter includes selecting a filter of the plurality of filters having a largest bandwidth that is equal to or less than a null-band of the signal of interest.

6. The method according to claim 4, further comprising using a narrow-band null search methodology to track the null-band on the signal of interest.

7. The method according to claim 3, wherein when the additional transmitting devices do not have signals present within a band of interest, the method includes determining if the transmitting device has a signal at a center transponder band.

8. The method according to claim 7, wherein when the transmitting device has a signal at a center transponder band, selecting a filter includes selecting a filter of the plurality of filters having a largest bandwidth that is equal to or less than a transponder stop-band of the signal of interest.

9. The method according to claim 7, further comprising using a narrow band null search to track the signal at the center transponder band.

10. The method according to claim 7, wherein when the transmitting device does not have a signal at a center transponder band, the method includes requesting a satellite service operator create a pseudo-beacon signal at a band unused by other transmitting devices within the antenna beam width.

11. The method according to claim 10, wherein selecting a filter includes selecting a filter of the plurality of filters having a largest bandwidth that is equal to or less than the pseudo-beacon signal.

12. The method according to claim 10, further comprising using a narrow band pseudo-beacon receiver methodology to track the pseudo-beacon signal on the signal of interest.

13. The method according to claim 1, further comprising using an antenna having a beamwidth greater than an angular spacing of geo-stationary transmitting devices.

14. A narrow-band received signal strength indicator (NbRSSI) circuit for tracking a signal of interest via a wideband antenna, comprising:
   a receiver circuit for receiving a signal and down converting the received signal to baseband;
   a logarithmic power detection amplifier;
   a plurality of independent filters selectively couplable between an output of the receiver circuit and an input of the logarithmic power detection amplifier, each filter of the plurality of independent filters having a bandwidth different from other filters of the plurality of independent filters; and
   a controller operative to
      determine which filter of the plurality of independent filters has a largest bandwidth that is equal to or less than a carrier frequency of the signal of interest, and
      select the filter of the plurality of independent filters having the largest bandwidth equal to or less than a bandwidth of the signal of interest to filter the signal of interest.

15. The NbRSSI circuit according to claim 14, wherein the controller is configured to
   determine the presence of other transmitting devices within a beamwidth of the antenna, and
   when other transmitting devices are not within the beam width of the antenna, select a filter having a largest bandwidth of the plurality of filters that is equal to or less than a carrier signal of the signal of interest.

16. The NbRSSI circuit according to claim 14, wherein the controller is configured to
   determine the presence of other transmitting devices within a beamwidth of the antenna, and
   when other transmitting devices are within the beam width of the antenna, determine if the additional transmitting devices have signals present within a band of interest.

17. The NbRSSI circuit according to claim 16, wherein the controller is configured to request a satellite service operator to create a null-band on the signal of interest when the additional transmitting devices have signals present within a band of interest.

18. The NbRSSI circuit according to claim 17, wherein the controller is configured to select a filter of the plurality of filters having a largest bandwidth that is equal to or less than the null-band of the signal of interest.

19. The NbRSSI circuit according to claim 17, wherein the controller is configured to use a narrow-band null search methodology to track the null-band on the signal of interest.

20. The NbRSSI circuit according to claim 16, wherein the controller is configured to determine if the transmitting device has a signal at a center transponder band when the additional transmitting devices do not have signals present within a band of interest.

21. The NbRSSI circuit according to claim 20, wherein the controller is configured to select a filter of the plurality of filters having a largest bandwidth that is equal to or less than a transponder stop-band of the signal of interest when the transmitting device has a signal at a center transponder band.

22. The NbRSSI circuit according to claim 20, wherein the controller is configured to use a narrow-band null search to track the signal at the center transponder band.

23. The NbRSSI circuit according to claim 20, wherein the controller is configured to request a satellite service operator create a pseudo-beacon signal at a band unused by other transmitting devices within the antenna beam width when the transmitting device does not have a signal at a center transponder band.

24. The NbRSSI circuit according to claim 23, wherein the controller is configured to select a filter of the plurality of filters having a largest bandwidth that is equal to or less than the pseudo-beacon signal.

25. The NbRSSI circuit according to claim 23, wherein the controller is configured to use a narrow-band pseudo-beacon receiver methodology to track the pseudo-beacon signal on the signal of interest.

26. The NbRSSI circuit according to claim 14, wherein the receiver circuit comprises:
a mixer for mixing a plurality of signals;
a local oscillator circuit having an output electrically connected to a first input of the mixer; and
a clock circuit electrically connected to the local oscillator output.

27. The NbRSSI circuit according to claim 26, wherein the clock circuit comprises:
an oscillator;
a global positioning system (GPS) receiver; and
a counter including a count input for counting a number of pulses and a reset input for resetting the counted number of pulses, wherein an output of the local oscillator is operatively coupled to the count input, and the output of the GPS receiver is operatively coupled to the reset input.

28. The NbRSSI circuit according to claim 14, further comprising a multiplexor operatively coupled to the plurality of filters and the controller, the multiplexor operative to selectively couple one of the plurality of filters between the output of the receiver circuit and the input of the logarithmic power amplifier.

29. An antenna acquisition and tracking positioning system for communicating with a satellite of a plurality of satellites, comprising:
an antenna including an output for outputting a received a signal;
the NbRSSI circuit according to claim 14 operatively coupled to the antenna output; and
positioning circuitry operatively coupled to an output of the NbRSSI circuit, the circuitry operative to command a position of the antenna based on data received from the NbRSSI circuit.

30. The system according to claim 29, wherein the positioning circuitry comprises a processor and memory, and positioning logic stored in the memory and executable by the processor, wherein when executed by the processor the positioning logic causes the processor to control a position of the antenna based on the output of the NbRSSI circuit.

31. The system according to claim 29, wherein the positioning circuitry is operative to: cause the antenna beam to sweep in heading;
monitor the received signal strength provided by the NbRSSI circuit;
identify a signal of interest based on an output of the NbRSSI circuit; and
command the antenna to a position corresponding to the signal of interest.

32. The system according to claim 29, wherein a beam-width of the antenna is greater than an angular spacing of the plurality of satellites.

33. The system according to claim 29, further comprising an actuator operatively coupled to the antenna and to the positioning circuitry, the actuator operative to effect a change in position of the antenna based on the command provided by the positioning circuitry.

34. The system according to claim 33, wherein the actuator comprises a motor and a motor controller.

* * * * *